United States Patent
Semsey et al.

(10) Patent No.: US 9,403,418 B2
(45) Date of Patent: Aug. 2, 2016

(54) METHOD FOR CONTROLLING THE RECUPERATION POWER OF A RECUPERATION-CAPABLE DRIVE, AND DEVICE FOR THIS PURPOSE

(71) Applicant: Continental Automotive GmbH, Hannover (DE)

(72) Inventors: Akos Semsey, Regensburg (DE); Christoph Baumgaertner, Lappersdorf (DE); Martin Bruell, Barbing (DE); Egor Sawazki, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/653,414

(22) PCT Filed: Feb. 13, 2014

(86) PCT No.: PCT/EP2014/052816
§ 371 (c)(1),
(2) Date: Jun. 18, 2015

(87) PCT Pub. No.: WO2014/125021
PCT Pub. Date: Aug. 21, 2014

(65) Prior Publication Data
US 2015/0336442 A1    Nov. 26, 2015

(30) Foreign Application Priority Data
Feb. 15, 2013   (DE) .......................... 10 2013 202 512

(51) Int. Cl.
*B60H 1/00* (2006.01)
(52) U.S. Cl.
CPC ............ *B60H 1/00642* (2013.01); *B60H 1/005* (2013.01); *B60H 1/00735* (2013.01); *B60H 1/00764* (2013.01); *B60H 1/00814* (2013.01)

(58) Field of Classification Search
CPC ...................... B60H 1/006425; Y10T 477/653
See application file for complete search history.

(56) References Cited

U.S. PATENT DOCUMENTS

| 5,507,153 A | 4/1996 | Seto et al. ........................ 62/133 |
| 7,433,770 B2 * | 10/2008 | Inagawa .............. F16H 57/0405 307/144 |

(Continued)

FOREIGN PATENT DOCUMENTS

| DE | 102006042162 A1 | 3/2008 | ............... B60H 1/00 |
| DE | 102009027558 A1 | 1/2011 | ............... B60H 1/00 |

(Continued)

OTHER PUBLICATIONS

International Search Report and Written Opinion, Application No. PCT/EP2014/052816, 12 pages, Jun. 13, 2014.

*Primary Examiner* — Thomas Tarcza
*Assistant Examiner* — Alex C Dunn
(74) *Attorney, Agent, or Firm* — Slayden Grubert Beard PLLC (57) ABSTRACT

A method for controlling a recuperation power of a recuperation-capable drive of a motor vehicle includes first determining a future temperature-control effort that represents the energy required to cool or heat the motor vehicle, and then conducting to a temperature-control device a temperature-control proportion of a recuperation power that has been extracted from the kinetic energy of the motor vehicle. The temperature-control device uses the temperature-control proportion of the converted recuperation power to heat or cool a motor vehicle interior of the motor vehicle. The magnitude of the temperature-control proportion is controlled based on the future temperature-control effort. An increasing temperature-control proportion is conducted to the temperature-control device in response to an increasing temperature-control effort.

9 Claims, 1 Drawing Sheet

(56) References Cited

U.S. PATENT DOCUMENTS

| | | | | |
|---|---|---|---|---|
| 7,946,505 B2* | 5/2011 | Lynam | ............... | B60H 1/00785 165/202 |
| 8,560,124 B2* | 10/2013 | Oakes | ............... | G06Q 40/00 700/276 |
| 2005/0007049 A1 | 1/2005 | Kim | ............... | 318/376 |
| 2010/0107635 A1* | 5/2010 | Tsubone | ............... | B60H 1/00492 60/659 |
| 2013/0306302 A1* | 11/2013 | Osaka | ............... | B60H 1/003858 165/287 |
| 2014/0114532 A1* | 4/2014 | Choi | ............... | G08G 1/167 701/36 |
| 2015/0066236 A1* | 3/2015 | Gehring | ............... | F01P 7/167 701/1 |

FOREIGN PATENT DOCUMENTS

| | | | | |
|---|---|---|---|---|
| DE | 102012004008 A1 | 9/2012 | ............... | B60H 1/00 |
| WO | 2012/076026 A1 | 6/2012 | ............... | B60K 6/485 |
| WO | 2014/125021 A1 | 8/2014 | ............... | B60H 1/00 |

\* cited by examiner

METHOD FOR CONTROLLING THE RECUPERATION POWER OF A RECUPERATION-CAPABLE DRIVE, AND DEVICE FOR THIS PURPOSE

CROSS-REFERENCE TO RELATED APPLICATIONS

This application is a U.S. National Stage Application of International Application No. PCT/EP2014/052816 filed Feb. 13, 2014, which designates the United States of America, and claims priority to DE Application No. 10 2013 202 512.2 filed Feb. 15, 2013, the contents of which are hereby incorporated by reference in their entirety.

TECHNICAL FIELD

The invention relates to the field of energy management within recuperation-capable motor vehicles and, in particular, to the management of the heat balance.

BACKGROUND

Document DE 10 2012 004 008 A1 discloses that at high external temperatures the recuperated electrical energy can be used to drive a compressor of a refrigerant circuit. In addition it is disclosed that at low external temperatures the recuperated electrical energy is fed to a braking resistor in order to convert said electrical energy into thermal energy in order to control the temperature of the passenger compartment of the motor vehicle.

Although this procedure provides advantages over systems in which only the flow of the recuperated energy to the battery is controlled, in order to charge the latter in a controlled fashion, it does not completely satisfy the requirement for the highest possible energy yield in recuperation-capable motor vehicles.

SUMMARY

One embodiment provides a method for controlling the recuperation power of a recuperation-capable drive of a motor vehicle, comprising: determining a future temperature-control expenditure which represents the energy required to cool or heat the motor vehicle; and conducting a temperature-control proportion of a recuperation power which has been extracted from kinetic energy of the motor vehicle to a temperature-control device which uses the temperature-control proportion of the converted recuperation power to heat or to cool the passenger compartment of the motor vehicle, wherein the magnitude of the temperature-control proportion is controlled as a function of the future temperature-control expenditure, and as the temperature-control expenditure rises an increasing temperature-control proportion is conducted to the temperature-control device.

In a further embodiment, the method also comprises conducting a buffer proportion of the recuperation power and, in particular, of the temperature-control proportion to a mechanical buffer, wherein as the temperature-control expenditure rises a decreasing buffer proportion or no buffer proportion is conducted to the buffer; or retrieving kinetic energy of the motor vehicle for the generation of electrical recuperation power and conducting a buffer proportion of the converted recuperation power to an electric buffer, wherein as the temperature-control expenditure rises a decreasing buffer proportion or no buffer proportion is conducted to the buffer.

In a further embodiment, the future temperature-control expenditure is determined based on an external temperature of the motor vehicle and at least one of the following variables: (a) a length and/or a duration of a predefined section of route lying ahead; (b) a distance and/or an expected travel duration until a predefined destination is reached by the motor vehicle, wherein the destination, the travel duration or the travel distance is predefined by a navigation device or by a user input, or the destination corresponds to a charging point at which electrical energy for charging the motor vehicle is available; (c) an estimated duration which passes between the shutting down of the motor vehicle and subsequent use; (d) an estimated amount of thermal energy which is input into the motor vehicle based on solar radiation; or (e) a filling level of a thermal accumulator to which the temperature-control device outputs heat or cold and from which heat or cold is used to heat or cool the motor vehicle at a later time; or based on one or more of these variables.

In a further embodiment, as the length increases and/or the duration increases an increasing temperature-control expenditure is determined; as the distance increases and/or as the expected travel duration until the predefined destination is reached increases, an increasing temperature-control expenditure is determined; as the estimated duration which passes between the shutting down of the motor vehicle and the subsequent use increases, an increasing temperature-control expenditure is determined; as the estimated thermal energy which is input into the motor vehicle increases, an increasing temperature-control expenditure is determined; or as the filling level of the thermal buffer increases, a decreasing temperature-control expenditure is determined.

In a further embodiment, the method also comprises: converting the temperature-control proportion of the recuperation power into heat by means of a force-heat machine of the temperature-control device; or converting the temperature-control proportion of the recuperation power or of the recuperation power itself into electrical power and converting this electrical power into heat by means of a power resistor of the temperature-control device; and/or using the temperature-control proportion of the recuperation power to control the temperature of a stream of fluid by means of a mechanically or electrically driven force-heat machine, a mechanically or electrically driven heating pump, a mechanically or electrically driven cooling machine or a thermoelectric element of the temperature-control device; wherein, during the temperature control of the stream of fluid by means of an electrically driven force-heat machine, heating pump, cooling machine or by means of a thermoelectric element, the temperature-control proportion of the recuperation power or the recuperation power itself is converted from a kinetic form of energy into an electrical form of energy before the use for temperature control by means of an electric machine.

In a further embodiment, the converted heat is used directly to heat a passenger compartment of the motor vehicle, is used directly to heat a heat medium circuit of the motor vehicle, or is fed to a thermal accumulator, preferably a latent heat accumulator, in order to retrieve the heat stored in the thermal accumulator at a later time and feed it to the passenger compartment of the motor vehicle or to the heat medium circuit of the motor vehicle; or the stream of fluid is used directly to control the temperature of the passenger compartment of the motor vehicle or is used directly to control the temperature of a heat medium circuit of the motor vehicle, or is used to control the temperature of a thermal accumulator, preferably a latent heat accumulator, in order to use the thermal accumulator at a later time to control the temperature of the passenger compartment of the motor vehicle or the heat medium circuit of the motor vehicle.

Another embodiment provides a device for controlling recuperation power of a recuperation-capable drive of a motor vehicle, comprising: a temperature-control expenditure estimator which has a data input, wherein the temperature-control expenditure estimator is configured to estimate, based on at least one value which is present at the data input, a future temperature-control expenditure which represents the energy necessary to cool or heat the motor vehicle; and an actuator element which is configured to set a temperature-control proportion of recuperation power which is present at a power input of the device, wherein the actuator element has a control input which is connected to the temperature-control expenditure estimator, and the actuator element is configured to set an increasing temperature-control proportion as the temperature-control expenditure rises, wherein the device also has a power output which is connected to the actuator element and is configured to output the temperature-control proportion.

In a further embodiment, the device also comprises a buffer which is connected downstream of the power output directly or via a converter, wherein the buffer is configured to store and output the temperature-control proportion and is connected to a temperature-control proportion output, wherein the buffer is an electric accumulator, a pneumatic accumulator, a flywheel accumulator or a spring force accumulator.

In a further embodiment, the data input is configured to be connected to a navigation device, to a use phase memory, to a brightness sensor or to a temperature sensor of a thermal buffer, and the temperature-control expenditure estimator has a mapping of values of a first variable onto values of a second variable, wherein the first variable is (a) a length or a duration of a section of route lying ahead which is present in the navigation device; (b) a distance and/or an expected travel duration until a predefined destination is reached by the motor vehicle, wherein the destination, the travel duration or the travel distance is predefined by the navigation device or by a user input interface of the device; (c) an estimated duration which passes between the shutting down of the motor vehicle and its subsequent use and which is present in the use phase memory; (d) a brightness value which is provided by the brightness sensor; or (E) a temperature value of the temperature sensor; and the second variable is the temperature-control expenditure which can be represented as a quantity of heat, quantity of cold or thermal energy difference; and, for the first variables specified under, the mapping forms a function which rises at least in certain sections and, for the first variable specified under, the mapping forms a function which falls at least in certain sections.

BRIEF DESCRIPTION OF THE DRAWING

An example embodiment is discussed below with reference to FIG. 1, which shows example of the device disclosed herein

DETAILED DESCRIPTION

Embodiments of the invention provide an improve energy management in a recuperation-capable motor vehicle, in particular with respect to an improved utilization of the used energy.

It has been recognized that it is not sufficient to control the flow of the recuperated electrical energy as a function of instantaneous temperature values. Instead, it has been recognized that significant optimization of the energy management is obtained if the recuperation power, i.e. the power which is generated by recuperating kinetic energy, is controlled based on a predictive approach.

It is proposed to estimate or determine future heating requirements and/or cooling requirements or a future temperature-control expenditure in order to use, as a function thereof, the recuperation power to control the temperature of the motor vehicle and, in particular, of the passenger compartment of the motor vehicle. The exclusive consideration of current temperatures can lead, in particular, to incorrect conclusions, with the result that control of the recuperation process on this basis can lead to a high, unnecessary consumption of energy as a result of temperature control.

In order to avoid having to use the energy of the battery for heating or cooling purposes (in general: temperature-control purposes), which energy has been charged with recuperation power, it is proposed to use the recuperation power for heating or cooling when necessary, without buffering said power in the battery. This conversion of recuperation power for temperature-control purposes is dependent on a future temperature-control expenditure which is determined. In particular, recuperation power is used for temperature-control purposes even if the battery is able to receive and can be charged if this is required by the determined future temperature-control expenditure, in particular in the case of a high future temperature-control expenditure. The use of the recuperation power for temperature-control purposes is implemented by virtue of the fact that either the passenger compartment is cooled directly and/or heat or cold which is generated with the recuperation power is buffered in a thermal accumulator. In particular, the ratio of the proportion of the recuperation power which is used directly to control the temperature of the motor vehicle, with respect to the proportion of the recuperation power which is input in a thermal accumulator, can depend on the future temperature-control expenditure and, in particular, on the estimated time of the occurrence of the temperature-control expenditure. The recuperation power can be used directly for the temperature-control of the motor vehicle and/or for storing heat or cold in a thermal accumulator, or can be buffered before conversion into heat or cold, in particular in a buffer which stores recuperation energy, for example, mechanically or electrically. The proportion of the recuperation power which is input into the buffer for recuperation energy (mechanical or electrical) as well as the proportion which is input as heat or cold in a thermal accumulator in a retrievable fashion can depend, in particular, on the future temperature-control expenditure, in particular on the time profile of the future temperature-control expenditure or on the time of occurrence of the future temperature-control expenditure.

Thermal energy with which a temperature, in particular temperature of the passenger compartment of the vehicle, of a temperature-control device or of a thermal accumulator, can be increased is referred to here as heat. The capability of reducing a temperature, in particular of the passenger compartment of the motor vehicle, of a temperature-control device of the passenger compartment of a motor vehicle or of the thermal accumulator by extracting heat from the system components (passenger compartment of the vehicle, temperature-control device or thermal accumulator) is denoted as cold. The terms heat and cold are used, in particular according to the customary definitions of thermodynamics or of refrigeration technology.

A method for controlling the recuperation power of a recuperation-capable drive of a motor vehicle is described. Drives which can convert kinetic energy into recuperation power (generally electrical or mechanical) are referred to as recuperation-capable drive. Drives of this type are, in particular, electric drives or hybrid drives with an electric drive component and an internal-combustion-engine-assisted drive component.

A future temperature-control expenditure is determined. The temperature-control expenditure represents the energy which is required to cool or heat the motor vehicle. In particular, the temperature-control expenditure corresponds to the energy which is necessary to control the temperature of the passenger compartment of the motor vehicle, in particular by means of a temperature-control device, and which serves to cool or heat the passenger compartment of the motor vehicle. The temperature-control device outputs the temperature-control proportion of the recuperation power directly or indirectly to the passenger compartment of the motor vehicle, in particular including conversion of the energy form of the temperature-control proportion by means of a converter or without conversion and/or including buffering in an electrical, mechanical or even thermal buffer or without buffering.

A temperature-control proportion of a recuperation power which has been extracted from kinetic energy of the motor vehicle is conducted to a temperature-control device. The temperature-control device uses the temperature-control proportion of the converted recuperation power to heat or to cool (i.e. generally to control the temperature of) the motor vehicle, in particular of the passenger compartment of a motor vehicle or a temperature-control device which controls the temperature of the passenger compartment of the motor vehicle. The magnitude of the temperature-control proportion is dependent on the future temperature-control expenditure. As the temperature-control expenditure rises, an increasing temperature-control proportion is conducted to the temperature-control device. In the case of a first temperature-control expenditure which is higher than a second temperature-control expenditure a larger temperature-control proportion is conducted to the temperature-control device than in the case of the second, low temperature-control expenditure. The temperature-control expenditure is a quantified variable and represents, in particular, a thermal energy difference which, during the temperature control, flows into or out of system components of the motor vehicle, in particular system components such as the temperature-control device which controls the temperature of the passenger compartment of the motor vehicle, the passenger compartment of the motor vehicle or the thermal accumulator which is connected to the passenger compartment of the motor vehicle in a heat-transmitting manner and whose temperature is controlled by the temperature-control device.

According to one embodiment of the method, a buffer proportion of the recuperation power is conducted to a buffer. This buffer is preferably mechanical and therefore stores the recuperation power in the form of mechanical energy, i.e. by means of spring force, by means of rotational energy or in a pneumatic fashion (i.e. as gas pressure). A mechanical buffer can be embodied, in particular, as a spring accumulator, flywheel accumulator or air pressure accumulator. The mechanical buffer can take up the recuperation power as electrical power, wherein a converter is provided which converts the electrical recuperation power into mechanical energy for storage in the buffer. Such a converter can be provided, in particular, as an electric machine.

Furthermore, the buffer can take up the recuperation power as mechanical energy, in particular by means of a rotating shaft whose movement provides the recuperation power as kinetic power. In particular, in this context, the buffer can be connected to the drive or output of the motor vehicle without converter, in order to directly take up kinetic power which is produced by retrieving (at least part) of the kinetic energy of the motor vehicle, in particular by braking.

As the temperature-control expenditure rises, a decreasing buffer proportion of the recuperation power is conducted to the buffer. In particular, when the temperature-control expenditure rises, in particular in the case of temperature-control expenditure above a predefined threshold, it is not even possible to conduct a buffer proportion to the buffer. In the last-mentioned case, the recuperation power is used to control the temperature of the motor vehicle. The difference between the recuperation power and the buffer proportion of the recuperation power is used to control the temperature of the motor vehicle, either directly or via buffering in a thermal accumulator. Preferably, as the temperature-control expenditure rises, a decreasing proportion of the recuperation power is fed into the thermal buffer, wherein the remaining proportion is used for directly controlling the temperature of the motor vehicle (i.e. for controlling the temperature of the passenger compartment of the motor vehicle, in particular by means of the temperature-control device which controls the temperature of the passenger compartment of the motor vehicle).

A further possibility is to convert kinetic power of the motor vehicle, which is acquired from the motion energy of the motor vehicle, into electrical recuperation power, in particular by means of an electric machine. A buffer proportion of the converted recuperation power is conducted into an electric buffer. The buffer proportion is, as also in the embodiment specified above, a proportion of the recuperation power. As the temperature-control expenditure rises, a decreasing buffer proportion or no buffer proportion is conducted to the buffer. In particular, no buffer proportion is conducted to the buffer if the temperature-control expenditure exceeds a predefined limit. The remaining power proportion, i.e. the difference between the recuperation power and the buffer proportion, is used for temperature control, in particular for controlling the temperature of the motor vehicle, in particular by means of a temperature-control device which controls the temperature of the passenger compartment of a motor vehicle, or is conducted to a thermal buffer after the remaining proportion of the recuperation power has been converted into thermal energy, in particular by means of a power resistor. The temperature-control device preferably serves to control the temperature of the passenger compartment of the vehicle and/or of the thermal buffer and/or to transmit heat from the thermal buffer to the passenger compartment of the vehicle. The outputting of power to the temperature-control device is linked, in particular, to the temperature control of the passenger compartment of the motor vehicle and/or of the thermal buffer or to the outputting of the retrieval of power from the thermal buffer by the temperature-control device for the temperature control of the passenger compartment of the motor vehicle.

According to a further embodiment, the future temperature-control expenditure is determined based on an external temperature of the motor vehicle in combination with at least one of the following variables or based on one of the following variables or a combination thereof. The determination of the future temperature-control expenditure can be based on a length and/or duration of a predefined section of route lying ahead. The longer the length or duration, the greater the future temperature-control expenditure which is determined. There is therefore a rising dependence, in particular at least in certain sections monotonously rising dependence, between the length or duration, on the one hand, and temperature-control expenditure, on the other. If the temperature-control expenditure is determined based on the length and the duration, dimensionless values, which represent the length and the duration, can thus be operated, in particular after previous weighting with predefined weighting values.

Furthermore, the variable based on which the future temperature-control expenditure is determined can be a distance and/or expected travel duration until a predefined destination is reached by the motor vehicle. Whereas in the possibility mentioned above a route section is already present, in particular within a navigation device, the temperature-control expenditure can be determined merely by means of distance (i.e. the distance as the crow flies) or by means of specified or learnt travel duration. In this context, the destination, the travel duration or the distance can be predefined by a navigation device.

In addition, the destination, the driving duration and/or the distance can be predefined by user input. The destination can be, in particular, a charging point (i.e. a charging station) at which electrical energy for charging the motor vehicle is available. This permits the actual estimation of the end point of the route section which is currently being travelled on and which can differ from the user destination if an intermediate stop is to be expected for refueling or charging the motor vehicle. Whether the destination is driven to, and is therefore to be taken into account in the method described here, can depend, in particular, on the range which the vehicle can still cover without taking on energy.

Furthermore, the variable based on which the future temperature-control expenditure is determined can be an estimated duration which passes between the shutting down of the motor vehicle and subsequent use. This duration can be estimated based on the time of day, in particular in conjunction with the current location and/or in conjunction with enhanced or learnt location data or use time period data of the motor vehicle. It is therefore possible, for example, for the temperature-control expenditure to be estimated as being small or equal to zero if the motor vehicle is at a specific location at a specific time and it is known from preceding periods of use that, in the case of previous uses of the vehicle, parking at this location approximately at this time of day was followed by long stationary times (for example longer than a predetermined limit such as 1 hour, 3 hours or 8 hours).

A further variable based on which the future temperature-control expenditure can be determined is an estimated amount of thermal energy which is input into the motor vehicle based on solar radiation. In particular, owing to the enclosed structure of the passenger compartment of the motor vehicle the heat which is generated by solar radiation is stored in the passenger compartment of the motor vehicle with the result that, for example, despite low external temperatures, a lower temperature-control expenditure can be provided than without solar radiation. With increasing brightness and decreasing angle between the direction of the irradiation and surface normals of windows of the motor vehicle, a decreasing (future) temperature-control expenditure is assumed.

Finally, the variable, based on which the future temperature-control expenditure is determined, can be a filling level of a thermal accumulator, in particular of the thermal accumulator described here. The temperature-control device outputs heat or cold to the thermal accumulator, wherein at a later time heat or cold for heating or cooling the motor vehicle, i.e. for controlling the temperature of the passenger compartment of the motor vehicle, is used from the thermal accumulator. If the filling level of the thermal accumulator is low, a higher temperature-control expenditure is provided than in the case of a comparatively higher filling level since in the case of a low filling level the thermal accumulator can contribute less to the temperature control than in the case of a high filling level. The filling level corresponds, in particular to the quantity of heat or cold which is stored in the thermal accumulator and which can be output to the passenger compartment of the motor vehicle or to a temperature-control device which controls the temperature of the passenger compartment of the motor vehicle. The filling level is dimensioned, in particular, based on the temperature of the thermal accumulator, i.e. based on the internal temperature of the thermal accumulator, preferably based on the difference between the temperature of the thermal accumulator, on the one hand, and a temperature comfort interval (with a predefined setpoint minimum temperature and setpoint maximum temperature) or a target temperature on the other hand. If a latent heat accumulator is used as a thermal accumulator, the phase state or the proportion of the solid phase compared to the liquid phase (or the gaseous phase compared to the liquid phase) can then be used as a filling level variable for representing the filling level.

This aforementioned variables can be combined with one another, in particular by means of a sum or by means of a weighted sum of values which represent at least two of the abovementioned variables. The weighting can be predefined, can depend on the vehicle user or can be variable, in particular in the form of a weighting whose weighting variables adapt to a mode of operation of the motor vehicle (for example a short-distance mode with a relatively wide temperature comfort interval compared to a long-distance mode with a relatively narrow temperature comfort interval or else a comfort mode compared to an eco mode).

One embodiment of the invention provides that as the length increases and/or as the duration increases an increasing temperature-control expenditure is determined, wherein this applies, in particular, to the first-mentioned or abovementioned variables. In addition, as the distance increases and/or as the expected travel duration until the predefined destination is reached increases, an increasing temperature-control expenditure can be defined, in particular in accordance with the second of the abovementioned variables.

In addition, as the estimated duration which passes between the shutting down of the motor vehicle and the subsequent use increases, an increasing temperature-control expenditure can be determined or defined, in particular with respect to the third of the above-mentioned variables.

In addition, as the estimated quantity of heat which is input into the motor vehicle increases, a increasing temperature-control expenditure can be determined, for example if the temperature of the passenger compartment is above a temperature comfort zone. Instead, as the estimated thermal energy which is input into the vehicle increases, a decreasing temperature-control expenditure can also be determined, in particular if the internal temperature of the motor vehicle (or of the passenger compartment of the motor vehicle) is below a comfort temperature zone.

Finally, as the filling level of the thermal accumulator or of the electrical or mechanical accumulator increases, a decreasing temperature-control expenditure can be determined, in particular in order to protect the storage reserves.

Further embodiments relate to the control of the quantity of heat which is generated from the recuperation power, wherein other embodiments relate to the separation of heat and therefore the generation of cold (and of heat which is to be conducted away) from the recuperation power.

A first embodiment therefore provides that the temperature-control proportion of the recuperation power is converted into heat by means of a force-heat machine of the temperature-control device, in order to separate heat into thermal energy at a high temperature and thermal energy at a low temperature (which corresponds to cold). Alternatively or in combination therewith, the temperature-control proportion of the recuperation power or the recuperation power itself can be converted into actual electrical power, wherein this electrical power is converted into heat by means of a power resistor of the temperature-control device. These two possibilities correspond to direct conversion of kinetic energy into heat or to conversion of kinetic recuperation energy into heat by means of intermediate conversion into electrical power, which is in turn converted into heat. The recuperation power can be converted into heat, in particular by means of a force-heat machine, or else by means of a device which generates heat by means of the generation of friction.

However, if the temperature-control device receives the temperature-control proportion as heat or cold, the temperature-control device only has a transfer function or distributor function in order to output the heat or cold to the passenger compartment of the motor vehicle, either directly or via a heat medium circuit.

If at least one converter is provided, which generates heat or cold from recuperation power (or the temperature-control proportion thereof) which is present in mechanical or electrical form, said converter being, for example, a thermo-electric element, a power resistor or one of the machines mentioned above, the temperature-control proportion is converted inside the temperature-control device or connected upstream thereof. In one specific embodiment, the specified converters can be part of the temperature-control device or connected upstream thereof, as illustrated also in FIG. 1.

Furthermore, it is possible to provide that the temperature-control proportion of the recuperation power is used to control the temperature of a stream of fluid.

In this context, a force-heat machine which is driven mechanically or electrically or a heating pump which is driven electrically or mechanically or a cooling machine which is driven electrically or mechanically or a thermoelectric element of the determining device can be used. During the temperature control of the stream of fluid by means of an electrically driven force-heat machine, by means of a heating pump, by means of a cooling machine or by means of the thermoelectric element, the temperature-control proportion of the recuperation power or the recuperation power itself is converted from a kinetic form of energy into an electrical form of energy by means of an electric machine for controlling the temperature. The electric machine is used here as a generator.

Further embodiments relate to the direct transportation of the heat to the passenger compartment of the motor vehicle, in particular via the temperature-control device, the transportation to a temperature-control device or the transportation to a thermal accumulator, wherein as an alternative the heat is firstly fed to a stream of fluid which is in turn used as the means of transporting heat or cold to the passenger compartment of the motor vehicle, in particular via the temperature-control device, to the temperature-control device itself or to the thermal accumulator.

There is therefore provision that the converted heat is used directly to heat a passenger compartment of the motor vehicle, is used directly to heat a heat medium circuit of the motor vehicle, in particular a heat medium circuit of a temperature-control device of the motor vehicle, or is fed to a thermal accumulator, in particular a latent heat accumulator. If the converted heat is fed to the thermal accumulator, this serves to retrieve the heat stored in the thermal accumulator again at a later time and to feed it to the passenger compartment of the motor vehicle or the heat medium circuit, i.e. the temperature-control device of the motor vehicle.

Alternatively, a stream of fluid, in particular the stream of fluid mentioned above, is used directly to control the temperature of the passenger compartment of the motor vehicle, or it is used directly to control the temperature of a heat medium circuit of the motor vehicle, in particular a heat medium circuit of the temperature-control device. In addition, the stream of fluid is used to control the temperature of a thermal accumulator, in particular a latent heat accumulator. If the stream of fluid is used to control the temperature of the thermal accumulator, this serves to use the thermal accumulator at a later time to control the temperature of the passenger compartment of the motor vehicle (preferably via the temperature-control device) or to control the temperature of the heat medium circuit (of the temperature-control device) of the motor vehicle.

The heat can therefore be transmitted by converting it directly at the location at which it is required (i.e. in the passenger compartment of the vehicle, in particular by means of a temperature-control device, in a temperature-control device which is connected upstream of the passenger compartment of the motor vehicle or at the heat medium circuit thereof or at or in a thermal accumulator). An alternative is firstly to heat a stream of fluid in order to use the stream of fluid as a means of transportation to the specified locations. When a stream of fluid is used, it is possible to use heating circuits which are already present and which are thermally connected to the stream of fluid. The stream of fluid can be provided, in particular, by the heat medium circuit or by an air stream which is connected into the passenger compartment of the motor vehicle.

Furthermore, a device for controlling recuperation power of a recuperation-capable drive of a motor vehicle is described. This device comprises a temperature-control expenditure estimator with a data input. The temperature-control expenditure estimator is configured to estimate a future temperature-control expenditure based on at least one value which is present at the data input. The temperature-control expenditure corresponds to the temperature-control expenditure described here and represents the energy which is necessary to cool or heat the motor vehicle.

The device also comprises an actuator element which is configured to set a temperature-control proportion of recuperation power. The recuperation power is that power which is present at a power input of the device. The device can therefore be considered to be a switch for the recuperation power, which switch sets the temperature-control portion of the (entire) recuperation power and divides it according to a control input of the actuator element. The actuator element therefore has the control input with which the temperature-control proportion at the actuator element can be set. The actuator element is configured to set an increasing temperature-control proportion as the temperature-control expenditure rises. The device also comprises a power output which is connected to the actuator element and is configured to output the temperature-control proportion. As already noted, the actuator element constitutes a switch (which can be adjusted continuously or into two or more discrete states) which sets the power flow of the recuperation power according to the temperature-control proportion. The control signals are taken up by the temperature-control expenditure estimator via the control input of the actuator element. The actuator element directs the recuperation power from the power input to the power output according to the temperature-control proportion, wherein only the temperature-control proportion is output at the power output. A further power output can be provided at which the difference between the recuperation power and the temperature-control proportion, i.e. the remaining recuperation power is output, preferably electrically and, in particular, to a battery in order to charge the latter. The battery is, in particular, a traction battery of the motor vehicle which stores energy electrically (or in some other way, i.e. by means of spring force, rotational energy or pneumatically) for the purpose of driving.

In particular, the actuator element and the temperature-control expenditure estimator implement the steps of the method described here.

One embodiment of the device provides that said device also comprises a buffer which is connected downstream of the power output (which outputs the temperature-control proportion). The buffer is configured to store and output the recuperation proportion. The buffer is connected to a temperature control proportion output. The temperature-control proportion output is part of the device and forms the interface with subsequent system components which can be connected thereto and which serve for temperature control. These system components are, in particular, the passenger compartment of the motor vehicle, a temperature-control device which serves to control the temperature of the passenger compartment of the motor vehicle, or a thermal buffer, downstream of which the passenger compartment of the motor vehicle or the temperature-control device of the passenger compartment of the motor vehicle is connected.

If, in an alternative embodiment, no thermal buffer is provided, the power output is connected directly to the temperature-control proportion output, connected thereto via a converter, wherein the converter is configured to convert the type of energy at the power output into thermal energy (for example in the case of a power resistor or the like), or the temperature-control proportion output is formed by the power output. The buffer can be an electric accumulator, a pneumatic accumulator, a flywheel accumulator or a spring force accumulator. The converter described above is embodied in accordance with the type of accumulator, wherein in the case of a removable storage device the converter is formed by the power resistor, and in the case of a pneumatic accumulator, flywheel accumulator or a spring force accumulator, it is a mechanical-thermal converter which can convert kinetic energy or energy which is controlled as a spring force into heat (or cold). In particular, the types of converter described based on the method are possible. In the case of an electric accumulator as buffer it is also possible to use a thermoelectric element in order to generate heat or cold.

A further embodiment of the device provides that the data input is configured to be connected to a navigation device, to a use phase memory, to a brightness sensor or to a temperature sensor of a thermal buffer. The temperature-control expenditure estimator comprises mapping of values of a first variable onto values of a second variable. The mapping can be provided to a look-up table by means of parameters which define a function which is configured to detect the mapping, or by some other digital or analog data processing unit which is programmable or non-programmable and which displays the mapping.

The first variable is that variable which is present at the data input and the second variable is the variable which represents the temperature-control expenditure as a value. The first variable corresponds, in particular, at least to one of the variables that are specified above within the scope of the method. The first variable can be a length or a duration of a section of route lying ahead. The section of route can be present here in the navigation device, in particular in an accumulator of the navigation device. This variable is referred to below by (A).

Furthermore, the first variable can be a distance and/or an expected travel duration until a predefined destination is reached by the motor vehicle. The destination, the travel duration or the travel distance can be predefined by the navigation device or by a user input interface of the device. This variable is denoted by (B). In contrast to the variable (A), which the route section is already present in the recuperation system, the variable (B) can be provided only by a simple value, for example if the route section has not yet been defined.

Furthermore, the first variable can be an estimated duration which passes between the shutting down of the motor vehicle and its subsequent use. This estimated duration is preferably present in the use phase memory. The use phase memory can be part of a use phase-detecting device which detects use phases of preceding uses, i.e. journeys of the motor vehicle. The chronological phases are detected, in particular, as duration, preferably in combination with a time marker which represents the time and/or date and/or times of day. The use phase memory can be, in particular, part of a learning device which processes regularly recurring use phases and creates customary use phases therefrom. As a result, a use phase pattern, which represents the customary recurring use phases, can be generated from a plurality of use phases. Examples of this are journeys from or to the workplace which follow a recurring pattern. The estimated duration described here is denoted as the variable (C).

Furthermore, the first variable can be a brightness value which is provided by the brightness sensor. The brightness sensor can be, in particular, a sensor which is used for air-conditioning in the motor vehicle, and which detects solar radiation into the vehicle, preferably as a function of the direction. In the case of a direction-dependent brightness sensor, the sensitivity of the sensor compared to the brightness is greater in first directions than in second directions in which the motor vehicle screens the passenger compartment from solar radiation more than in the first directions. The brightness value is referred to as a variable (D).

The first variable can also be a temperature value of the temperature sensor. The temperature value generally represents the temperature and therefore the filling level of the thermal buffer. When a temperature is sensed without a temperature sensor, the temperature value corresponds to the detected temperature, which can also be calculated, for example, based on models. The temperature value is referred to as a variable (E).

The temperature-control expenditure can be determined by the temperature-control expenditure estimator based on the values of the variables (A)-(E).

The second variable is therefore the temperature-control expenditure. The latter can be represented as a quantity of heat, quantity of cold or thermal energy difference, in particular, the difference in energy which is necessary to adjust the temperature of the passenger compartment of the motor vehicle in future to a predetermined comfort range.

In further embodiments, which can be combined in particular with the preceding embodiment, the mapping forms a function which rises at least in certain sections, if the first variable is the variable (A), the variable (B), the variable (C) or the variable (D). If the first variable is the variable (E), the mapping preferably forms a function which falls at least in certain sections. In the varying embodiments, the mapping can also form a function which falls in certain sections if the first variable is the variable C or D. This is the case, in particular, if it is to be expected that as the estimated duration increases a decreasing quantity of heat or cold has to be fed to the motor vehicle, since, for example, a strong temperature difference between the setpoint state and the actual state of the passenger compartment of the motor vehicle is only present at the beginning and only the escaping heat or cold has to be compensated by the temperature-control expenditure starting from the time when a predefined temperature comfort range is reached. In the case of the variable (D), a decreasing function can be provided if the temperature of the passenger compartment of the motor vehicle is below a comfort zone, but a quantity of thermal energy which is input from the outside, for example by solar radiation, serves to additionally heat the passenger compartment of the motor vehicle and, therefore, the additional temperature-control expenditure is reduced by the procedure described here by the quantity of thermal energy that is input from the outside.

The procedure described here can also be implemented by means of a computer program product which implements the data input, the temperature-control expenditure estimator and the function which is to be set of the actuator element, as are described here.

Figure 1:
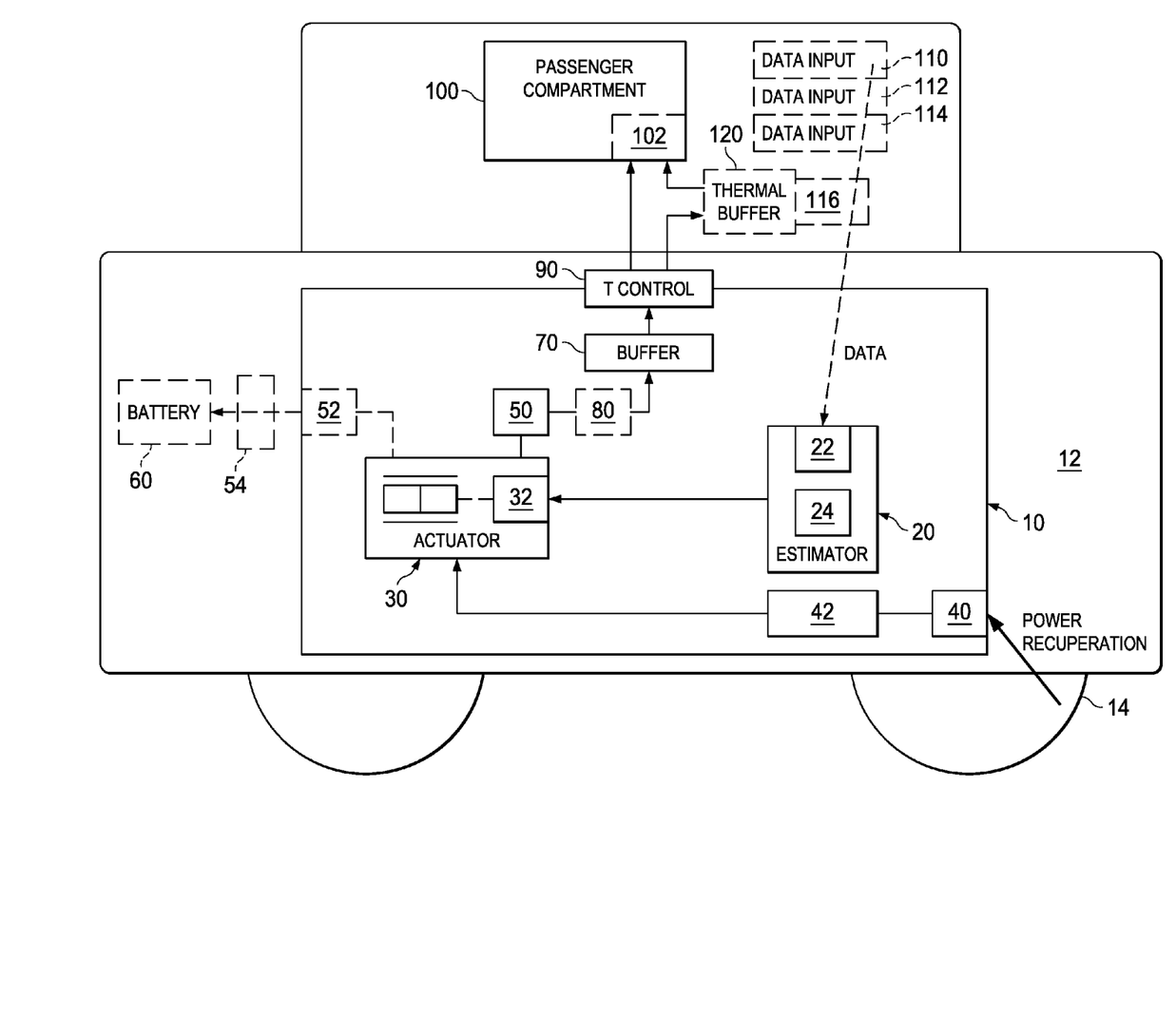

FIG. 1 shows a diagram of the device described here and serves to explain the method described here. A device 10 is illustrated within a motor vehicle 12, wherein the motor vehicle 12 comprises a drive 14 which can output recuperation power to the device 10 according to the illustrated arrow on the drive 14. The device 10 comprises a temperature-control expenditure estimator 20 with a data input 22. The temperature-control expenditure estimator 20 is configured to estimate a future temperature-control expenditure based on the data at the data input 22. For this purpose, the temperature-control expenditure estimator 20 comprises a mapping 24 which is connected to the data input 22 in order to detect a first variable as is described here.

The device 10 also comprises an actuator element 30, which is configured to set a temperature-control proportion of the recuperation power which originates from a drive 14. The actuator element has a control input 32, which is connected downstream of the temperature-control expenditure estimator 20. The mapping 24 maps the variable which is input at the input 22 onto a second variable, and transmits it to the control input 32 of the actuator element 30 via the illustrated connection.

The actuator element 30 is connected to a power input 40 of the device 10 via which the actuator element receives the recuperation energy from the drive 14, in particular via a mechanical-electrical converter 42 which is configured as an electric machine and, in particular, as a generator. In the case illustrated, the actuator element 30 therefore receives electrical power. In an alternative embodiment, the converter 42 is replaced by a direct connection. The device 10 also comprises a power output 50 which is connected to the actuator element 30. A further optional power output 52 of the device 10 is configured to be connected to a battery 60 which can be charged. For this purpose, a converter 54 can be provided, in particular if the actuator element 30 receives the recuperation power as kinetic energy. In this case, the converter 54 is a mechanical-electrical converter.

As is illustrated symbolically, the actuator element 30 divides the recuperation energy which originates from the power input 40 into a temperature-control proportion, which is output to the power output 50 (and into an optional further proportion which is used to charge the battery 60). The power output 50 outputs the temperature-control proportion of the recuperation power to a temperature-control proportion output 90 of the device. This can be done directly, for example if the power output 50 and the temperature-control proportion output 90 are identical. In the illustrated embodiment, the power output 50 of the actuator element 30 outputs the temperature-control proportion to initially one buffer 70, which can in turn output the temperature-control proportion (with offset timing) to the temperature-control proportion output 90 of the device. The temperature-control proportion output 90 can output the temperature-control proportion as heat or in the form of kinetic or electrical energy, with the result that subsequent system components can generate heat and/or cold therefrom. A converter 80, which converts the form of energy of the power output 50 before the output to the temperature-control proportion output 90, can be provided between the power output 50 and the temperature-control proportion output 90. Alternatively, the converter can also be provided between the buffer 70 and the temperature-control proportion output 90, in particular if the buffer 70 stores a different type of energy than is output to the temperature-control proportion output 90. The buffer 70 can be an electric buffer in the form of an electric battery or can be a mechanical buffer in the form of a pneumatic accumulator, a flywheel accumulator or a spring force accumulator.

As illustrated in FIG. 1, the temperature-control proportion output, which is part of the device, can output the temperature-control proportion to further components of the motor vehicle, in particular to a passenger compartment 100 of the motor vehicle, or else to a temperature-control device 102 of the passenger compartment 100 of the motor vehicle, which temperature-control device 102 controls the temperature of the passenger compartment 100 of the motor vehicle. In particular the passenger cell is referred to as the passenger compartment 100 of the motor vehicle.

Furthermore it is possible to provide that the outputting to the passenger compartment of the motor vehicle or to the temperature-control device thereof takes place directly or via a thermal buffer 120, which can be embodied, in particular as a latent heat accumulator (in particular an accumulator with phase change materials, also referred to as PCM). Alternatively, the thermal buffer 120 can have a mass whose thermal capacity for buffering also stores without a phase change.

The accumulators described here take up the same type of energy as they also output. The converters described here convert the input power or energy into another type of energy. In one specific embodiment, which can be particularly easily integrated into existing systems, kinetic energy is taken up by the drive 14 via the power input 40 and converted into electrical energy by the converter 42 (in the form of an electrical generator). In this case, electrical energy is fed via the actuator element. In the last-mentioned case, the actuator element is preferably embodied as a semiconductor switch or electromechanical switch. Electrical energy is output at the power output 50, and in the abovementioned specific embodiment is output directly to the temperature-control proportion output 90 without conversion and without buffering (i.e. without the components 70 and 80), which temperature-control proportion output 90 therefore outputs the temperature-control proportion as electrical power. In this case, the temperature-control proportion output 90 and the power output 50 of the actuator element can be identical. In the abovementioned specific embodiment, the temperature-control proportion is then present at the temperature-control proportion output 90 as electrical power which can be output to further components of the motor vehicle. These components are, in particular, embodied as recuperation resistor or as a heat-force machine or cold-force machine or as a thermoelectric element which heats the passenger compartment 100 of the motor vehicle. Alternatively, a converter 80 in the form of a power resistor can be provided between the power output 50 and the temperature-control proportion output 90, with the result that the temperature-control proportion is output as heat at the temperature-control proportion output 90, which heat is passed on to the passenger compartment 100 of the motor vehicle in order to control the temperature thereof. Optionally, or in combination therewith, the heat from the temperature-control proportion output 90 can be output to a thermal accumulator 120 in the form of a latent heat accumulator, which in turn outputs the temperature-control proportion completely or partially to a passenger compartment 100 of the motor vehicle or to the temperature-control device 102 thereof. In particular, the heat which is output by the temperature-control proportion output 90 can be divided between the thermal buffer 120 and the passenger compartment 100 of the motor vehicle or the temperature-control device 102 thereof, preferably according to a variable division ratio which is regulated according to a preferred comfort temperature range of the passenger compartment 100 of the vehicle.

The data input 22 of the temperature-control expenditure estimator 20 receives data from vehicle components, in particular from a navigation device 110, from a use phase memory 112 or from a brightness sensor 114. Furthermore, the data input 22 can receive data from a temperature sensor 116 of the thermal buffer. The data flow is represented schematically with the downward pointing arrow which is illustrated by dashed lines.

In the temperature-control expenditure estimator 20, the mapping 24 is provided which maps the (at least one) first variable at the data input 22, and also values which represent the temperature-control expenditure. These values are passed on to the control input 32 of the actuator element 30 in order to set the temperature-control proportion correspondingly. The mapping 24 has, in particular, the function of an estimator in order to estimate, from the first variable which is present at the data input 22, the second variable in the form of the temperature-control proportion and to feed it as a value to the control input 32.

In an embodiment (not illustrated), in particular a temperature sensor can be provided which detects the temperature of the passenger compartment of the motor vehicle. The latter can be output to the actuator element or to a controller of the actuator element, with the result that the level of the temperature-control proportion (with respect to the recuperation power) can be set, and, in particular, closed-loop controlled, in accordance with the current temperature of the passenger compartment of the motor vehicle. Within the scope of this closed-loop control, the temperature comfort interval or the target temperature is used as the closed-loop control target.

LIST OF REFERENCE NUMBERS

10 Device for controlling the recuperation power
12 Motor vehicle
14 Drive of the motor vehicle
20 Temperature-control expenditure estimator
22 Data input of the temperature-control expenditure estimator
24 Mapping of the temperature-control expenditure estimator
30 Actuator element
32 Control input of the actuator element
40 Power input
42 (optional) converter
50 Power output
52 Optional second power output for outputting charge power to a battery
54 Optional converter
50 Battery of the motor vehicle, in particular traction battery for storing electrical energy
70 Buffer
80 Optional converter
90 Temperature-control proportion output of the device 10
100 Passenger compartment of motor vehicle
102 Temperature-control device of the passenger compartment of the motor vehicle
110 Navigation device
112 Use phase memory
114 Brightness sensor
116 Temperature sensor of the thermal buffer
120 Thermal buffer

What is claimed is:

1. A method for controlling a recuperation power of a recuperation-capable drive of a motor vehicle, the method comprising:
   determining a future temperature-control expenditure that represents the energy required to cool or heat the motor vehicle; and
   conducting to a temperature-control device a temperature-control proportion of a recuperation power that has been extracted from kinetic energy of the motor vehicle,
   conducting a buffer proportion of the temperature-control proportion to a buffer, wherein as the temperature-control expenditure rises the buffer proportion conducted to the buffer decreases,
   the temperature-control device using the temperature-control proportion of the converted recuperation power to heat or to cool the passenger compartment of the motor vehicle,
   controlling the magnitude of the temperature-control proportion as a function of the determined future temperature-control expenditure, such that the temperature-control proportion conducted to the temperature-control device is increased in response to a rise in the temperature-control expenditure.

2. The method of claim 1, further comprising:
   conducting the buffer proportion of the temperature-control proportion to a mechanical buffer; or
   conducting the buffer proportion of the converted recuperation power to an electric buffer.

3. The method of claim 1, wherein the future temperature-control expenditure is determined based on an external temperature of the motor vehicle and at least one of the following variables:
   (a) at least one of a length or a duration of a predefined section of route lying ahead;
   (b) at least one of a distance or an expected travel duration of a predefined destination is reached by the motor vehicle, wherein the destination, the travel duration or the travel distance is predefined by a navigation device or by a user input, or wherein the destination corresponds to a charging point at which electrical energy for charging the motor vehicle is available;
   (c) an estimated duration that passes between a shutting down of the motor vehicle and a subsequent use of the motor vehicle;
   (d) an estimated amount of thermal energy that is input into the motor vehicle based on solar radiation; or
   (e) a filling level of a thermal accumulator to which the temperature-control device outputs heat or cold and from which heat or cold is used to heat or cool the motor vehicle at a later time.

4. The method of claim 3, comprising:
   determining an increasing temperature-control expenditure in response to an increase in at least one of the length or the duration;
   determining an increasing temperature-control expenditure in response to an increase in at least one of the distance increases or the expected travel duration until the predefined destination is reached;

determining an increasing temperature-control expenditure in response to an increase in the estimated duration that passes between the shutting down of the motor vehicle and the subsequent use of the motor vehicle;

determining an increasing temperature-control expenditure in response to an increase in the estimated thermal energy that is input into the motor vehicle; or determining a decreasing temperature-control expenditure in response to an increase in the filling level of the thermal buffer.

5. The method of claim 1, further comprising at least one of:

converting the temperature-control proportion of the recuperation power into heat by a force-heat machine of the temperature-control device; or converting the temperature-control proportion of the recuperation power or of the recuperation power itself into electrical power and converting such electrical power into heat by a power resistor of the temperature-control device; or using the temperature-control proportion of the recuperation power to control the temperature of a stream of fluid by a mechanically or electrically driven force-heat machine, a mechanically or electrically driven heating pump, a mechanically or electrically driven cooling machine, or a thermoelectric element of the temperature-control device;

wherein, during the temperature control of the stream of fluid by an electrically driven force-heat machine, heating pump, cooling machine, or a thermoelectric element, the temperature-control proportion of the recuperation power or the recuperation power itself is converted from a kinetic form of energy into an electrical form of energy before the use for temperature control by an electric machine.

6. The method of claim 5, wherein:

the converted heat is used directly to heat a passenger compartment of the motor vehicle, is used directly to heat a heat medium circuit of the motor vehicle, or is fed to a latent heat accumulator, to thereby retrieve the heat stored in the thermal accumulator at a later time and feed it to the passenger compartment of the motor vehicle or to the heat medium circuit of the motor vehicle; or the stream of fluid is used directly to control the temperature of the passenger compartment of the motor vehicle or is used directly to control the temperature of a heat medium circuit of the motor vehicle, or is used to control the temperature of a thermal accumulator, preferably a latent heat accumulator, to thereby use the thermal accumulator at a later time to control the temperature of the passenger compartment of the motor vehicle or the heat medium circuit of the motor vehicle.

7. A device for controlling recuperation power of a recuperation-capable drive of a motor vehicle, the device comprising:

a temperature-control expenditure estimator including a data input and being configured to estimate, based on at least one value present at the data input, a future temperature-control expenditure that represents an energy necessary to cool or heat the motor vehicle; and an actuator element configured to set a temperature-control proportion of recuperation power present at a power input of the device, wherein the actuator element includes a control input connected to the temperature-control expenditure estimator, and wherein the actuator element is configured to set an increasing temperature-control proportion as the temperature-control expenditure rises, a power output connected to the actuator element and configured to output the temperature-control proportion, and a buffer connected downstream of the power output directly or via a converter, wherein the buffer is configured to store and output the temperature-control proportion and is connected to a temperature-control proportion output.

8. The device of claim 7, wherein the buffer comprises an electric accumulator, a pneumatic accumulator, a flywheel accumulator, or a spring force accumulator.

9. The device of claim 7, wherein the data input is configured for connection to a navigation device, to a use phase memory, to a brightness sensor, or to a temperature sensor of a thermal buffer, and wherein the temperature-control expenditure estimator comprises a mapping of values of a first variable onto values of a second variable, wherein the first variable comprises:

(A) a length or a duration of a section of route lying ahead which is present in the navigation device;

(B) at least one of a distance or an expected travel duration of a predefined destination of the motor vehicle, wherein the destination, the travel duration or the travel distance is predefined by the navigation device or by a user input interface of the device;

(C) an estimated duration that passes between a shutting down of the motor vehicle and a subsequent use of the motor vehicle, which estimated duration is present in the use phase memory;

(D) a brightness value provided by the brightness sensor; or (E) a temperature value of the temperature sensor; and wherein the second variable comprises the temperature-control expenditure represented as a quantity of heat, a quantity of cold, or a thermal energy difference; and, wherein for the first variable, the mapping forms a function that rises at least in certain first sections and falls in certain section sections.

* * * * *